United States Patent
Kataoka et al.

(10) Patent No.: US 8,627,938 B2
(45) Date of Patent: Jan. 14, 2014

(54) POWER TRANSMITTING APPARATUS

(75) Inventors: Makoto Kataoka, Hamamatsu (JP);
Naoyuki Miwa, Hamamatsu (JP);
Satoru Kashiwagi, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 13/560,923

(22) Filed: Jul. 27, 2012

(65) Prior Publication Data
US 2013/0025997 A1 Jan. 31, 2013

Related U.S. Application Data

(63) Continuation of application No. PCT/JP2011/051488, filed on Jan. 26, 2011.

(30) Foreign Application Priority Data

Jan. 27, 2010 (JP) .................................. 2010-014917

(51) Int. Cl.
*F16D 13/52* (2006.01)
*F16D 43/21* (2006.01)
(52) U.S. Cl.
USPC .................. 192/70.23; 192/89.21; 192/89.26
(58) Field of Classification Search
USPC .................. 192/70.23, 85.5, 89.21, 89.26, 96
See application file for complete search history.

(56) References Cited

U.S. PATENT DOCUMENTS

| 7,681,705 | B2 * | 3/2010 | Okada et al. | 192/70.23 |
| 8,146,724 | B2 * | 4/2012 | Miyazaki et al. | 192/70.23 |
| 8,151,963 | B2 * | 4/2012 | Kataoka et al. | 192/70.23 |
| 8,162,119 | B2 * | 4/2012 | Matsuda | 192/70.23 |

FOREIGN PATENT DOCUMENTS

| JP | S61-09622 | 5/1986 |
| JP | S61-149618 | 7/1986 |
| JP | S63-186037 | 8/1988 |
| JP | H05-071554 | 3/1993 |
| JP | 2008-303975 | 12/2008 |
| WO | WO 2011/093335 A1 | 8/2011 |

* cited by examiner

*Primary Examiner* — David D Le
*Assistant Examiner* — Jacob S Scott
(74) *Attorney, Agent, or Firm* — Knobbe, Martens, Olson & Bear LLP

(57) ABSTRACT

A power transmitting apparatus can include a clutch housing, a plurality of driving and driven clutch plates, a clutch member, a pressure member, an intermediate member, a plurality of urging devices, and a back-torque limiting cam. The power transmitting apparatus can further include an urging force cut-off device for cutting-off the urging force applied to the pressure member from particular urging devices of the plurality of urging devices by separating the inner ends of the particular urging devices from the pressure member when the intermediate member is moved toward the pressure member by the action of the back-torque limiting cam.

10 Claims, 13 Drawing Sheets

(a)

(b)

US 8,627,938 B2

POWER TRANSMITTING APPARATUS

CROSS-REFERENCE TO RELATED APPLICATIONS

This is a continuation of PCT Application No. PCT/JP2011/051488, filed on Jan. 26, 2011, which claims priority to Japanese Patent Application No. 2010-014917, filed on Jan. 27, 2010. The foregoing applications are hereby incorporated by reference herein in their entirety.

BACKGROUND OF THE DISCLOSURE

1. Field of the Disclosure

The present inventions relate to a power transmitting apparatus for transmitting or cutting-off a rotational power of the input member to or from the output member.

2. Description of the Related Art

In general, power transmission apparatuses for vehicles such as motorcycles are designed to transmit and cut-off a power of an engine to a transmission and a driving wheel. Such power transmission apparatus typically include an input member connected to an engine-side, an output member connected to the transmission and the driving wheel-side, and a clutch member connected to the output member. Power can be transmitted by pressure-contacting a plurality of driving clutch plates with a plurality of driven clutch plates and can be cut-off by releasing the pressure-contacting force between the driving clutch plates and driven clutch plates.

Some known power transmitting apparatuses include a clutch housing rotatable together with an input member and a plurality of driving clutch plates mounted thereon. The power transmitting apparatus further comprises a plurality of driven clutch plates alternately arranged between the driving clutch plates of the clutch housing, a clutch member connected to an output member, a pressure member mounted on the clutch member and axially movable relative to the clutch member for carrying out the pressure-contact and release between the driving clutch plates and the driven clutch plates with its axial movement relative to the clutch member, and an intermediate member spline-fitted thereon with the driven clutch plates. This type of power transmitting apparatus is constructed so that a rotational power inputted to the input member may be transmitted or cut-off to or from the output member by performing pressure-contact or release between the driving clutch plates and the driven clutch plates.

Additionally, some power transmitting apparatuses include back-torque limiting cams. Such back torque limiting cams typically comprise clutch member-side cam surfaces formed on the clutch member and intermediate member-side cam surfaces formed on the intermediate member. The back torque cams are adapted to axially move the pressure member and the clutch member by the cam action between the clutch member-side cam surfaces and the intermediate member-side cam surfaces in order to release the pressure-contact between the driving clutch plates and the driven clutch plates when the rotational speed of the output member has exceeded that of the input member and a relative rotation between the pressure member as well as the intermediate member and the clutch member has been caused (see e.g. Japanese Laid-open Patent Publication No. 96222/1986 and Japanese Laid-open Patent Publication No. 149618/1986).

SUMMARY OF THE DISCLOSURE

In the power transmitting apparatus of the prior art noted above, when the rotational speed of the output member has exceeded that of the input member and a relative rotation between the pressure member as well as the intermediate member and the clutch member has been caused, the transmitting torque is reduced by the movement of the pressure member due to action of the back-torque limiting cam and thus the pressure member tries to return to the pressure-contacted position (position in which the driving clutch plates and the driven clutch plates are pressure-contacted). However, if the rotational speed of the output member still exceeds that of the input member when the pressure member has returned to the pressure-contacted position, the back-torque limiting cam is again actuated. This causes an instantaneous reciprocation phenomenon of the pressure member between the pressure-contacted position and the released position (position in which the pressure-contact between the driving clutch plates and the driven clutch plates are released). If one tries to operate the clutch lever under such an instantaneous reciprocation phenomenon of the pressure member, the operability of clutch operation would be worsened since the instantaneous reciprocation of the pressure member is transmitted to the clutch lever as vibration.

An aspect of at least one of the inventions disclosed herein includes the realization that power transmitting apparatuses can improve the operability of clutch operation, for example, by preventing the instantaneous reciprocation of the pressure member when the back-torque limiting cam is operated.

Thus, in accordance with an embodiment, a power transmitting apparatus can comprise a clutch housing rotatable together with an input member. The power transmitting apparatus can further comprise a plurality of driving clutch plates mounted on the clutch housing and a plurality of driven clutch plates alternately arranged between the driving clutch plates of the clutch housing. In some embodiments, the power transmitting apparatus comprises a clutch member connected to an output member and a pressure member mounted on the clutch member. The pressure member can be axially movably relative to the clutch member and axial movement of the pressure member relative to the clutch member can create pressure-contact or release between the driving clutch plates and the driven clutch plates. The power transmitting apparatus can include an intermediate member spline-fitted with the driven clutch plates and interposed between the clutch member and the pressure member. The intermediate member can be configured to rotate with the clutch member and the pressure member. A plurality of urging devices having outer ends can be mounted on a securing member. The securing member can be secured on a boss portion projected from the clutch member. The plurality of urging devices can have inner ends mounted on the pressure member and can be configured to normally urge the pressure member toward the intermediate member and the clutch member to achieve the pressure-contact between the driving clutch plates and the driven clutch plates. In some embodiments, the power transmitting apparatus includes a back-torque limiting cam having clutch member-side cam surfaces formed on the clutch member and intermediate member-side cam surfaces formed on the intermediate member. The back-torque cam can be adapted to axially move the intermediate member by a cam action between the clutch member-side cam surfaces and the intermediate member-side cam surfaces to release the pressure-contact between the driving clutch plates and the driven clutch plates when a rotational speed of the output member has exceeded that of the input member and a relative rotation between the intermediate member and the clutch member is created. A rotational power inputted to the input member may be transmitted to or cut-off from the output member by creating pressure-contact or release between the driving clutch plates and the driven clutch plates. The power transmitting apparatus can further comprise an urging force cut-off device for cutting-off an urging force applied to the pressure member from one or more of the plurality of urging devices by separating the inner ends of the one or more urging devices from the pressure member when the intermediate member is moved toward the pressure member by the cam action of the back-torque limiting cam.

In some embodiments, the urging force cut-off device comprises a plurality of moving members interposed between the inner ends of the urging devices and the pressure member. The moving members can be configured to separate the inner ends of the particular urging devices from the pressure member when the moving members are pushed and thus moved by the intermediate member when the intermediate member is moved toward the pressure member by the action of the back-torque limiting cam.

In some embodiments, the pressure member is formed with a plurality of recessed portions for receiving the urging devices. One or more of the recessed portions can have a bottom formed with an opening and can be adapted to receive one or more of the plurality of urging devices and one or more of the moving members. Each of the moving members can have a projection configured to be projected from the opening of the recessed portion toward the intermediate member.

In some embodiments, a plurality of the recessed portions are formed on a concentric circumference of the pressure member. The plurality of recessed portions can be adapted to receive one or more of the plurality of urging devices. Furthermore, one or more of the moving members can be formed on a circumference of the pressure member substantially equidistantly apart from each other.

According to some embodiments, a power transmitting apparatus can comprise a clutch housing rotatable together with an input member. The power transmitting apparatus can further comprise a plurality of driving clutch plates mounted on the clutch housing and a plurality of driven clutch plates alternately arranged between the driving clutch plates of the clutch housing. In some embodiments, the power transmitting apparatus comprises a clutch member connected to an output member and a pressure member mounted on the clutch member. The pressure member can be axially movably relative to the clutch member and axial movement of the pressure member relative to the clutch member can create pressure-contact or release between the driving clutch plates and the driven clutch plates. The power transmitting apparatus can include an intermediate member spline-fitted with the driven clutch plates and interposed between the clutch member and the pressure member. The intermediate member can be configured to rotate with the clutch member and the pressure member. A plurality of urging devices having outer ends can be mounted on a securing member. The securing member can be secured on a boss portion projected from the clutch member. The plurality of urging devices can have inner ends mounted on the pressure member and can be configured to normally urge the pressure member toward the intermediate member and the clutch member to achieve the pressure-contact between the driving clutch plates and the driven clutch plates. In some embodiments, the power transmitting apparatus includes a back-torque limiting cam having clutch member-side cam surfaces formed on the clutch member and intermediate member-side cam surfaces formed on the intermediate member. The back-torque cam can be adapted to axially move the intermediate member by a cam action between the clutch member-side cam surfaces and the intermediate member-side cam surfaces to release the pressure-contact between the driving clutch plates and the driven clutch plates when a rotational speed of the output member has exceeded that of the input member and a relative rotation between the intermediate member and the clutch member is created. A rotational power inputted to the input member may be transmitted to or cut-off from the output member by creating pressure-contact or release between the driving clutch plates and the driven clutch plates. The power transmitting apparatus can further comprise a means for cutting-off an urging force applied to the pressure member from one or more of the plurality of urging devices by separating the inner ends of the one or more urging devices from the pressure member when the intermediate member is moved toward the pressure member by the cam action of the back-torque limiting cam.

In accordance with an embodiment, a power transmitting apparatus can comprise a clutch housing rotatable together with an input member and a plurality of driving clutch plates mounted thereon. The power transmitting apparatus can further comprise a plurality of driven clutch plates alternately arranged between the driving clutch plates of the clutch housing, a clutch member connected to an output member, and a pressure member mounted on the clutch member and axially movable relative to the clutch member for carrying out the pressure-contact or release between the driving clutch plates and the driven clutch plates with its axial movement relative to the clutch member. In some embodiments, the power transmitting apparatus includes an intermediate member spline-fitted with the driven clutch plates and interposed between the clutch member and the pressure member so as to be rotated together therewith.

The power transmitting apparatus can further include a plurality of urging devices, one end (hereinafter referred to as "outer ends") of each urging device being mounted on a securing member secured on a boss portion projected from the clutch member, and the other end (hereinafter referred to as "inner ends") of each urging device being mounted on the pressure member, the urging devices being arranged so that they normally urge the pressure member toward the intermediate member and the clutch member to achieve a pressure-contact between the driving clutch plates and the driven clutch plates. In some embodiments, the power transmitting apparatus includes a back-torque limiting cam having clutch member-side cam surfaces formed on the clutch member and intermediate member-side cam surfaces formed on the intermediate member. The back torque limiting cam can be configured to axially move the intermediate member by the cam action between the clutch member-side cam surfaces and the intermediate member-side cam surfaces to release the pressure-contact between the driving clutch plates and the driven clutch plates when the rotational speed of the output member has exceeded that of the input member and a relative rotation between the intermediate member and the clutch member has been caused. A rotational power inputted to the input member may be transmitted to or cut-off from the output member by performing pressure-contact or release between the driving clutch plates and the driven clutch plates. The power transmitting apparatus can further comprise an urging force cut-off device for cutting-off the urging force applied to the pressure member from particular urging devices of the plurality of urging devices by separating the inner ends of the particular urging devices from the pressure member when the intermediate member is moved toward the pressure member by the action of the back-torque limiting cam.

In some embodiments, where the power transmitting apparatus is provided with an urging force cut-off device for cutting-off the urging force applied to the pressure member from particular urging devices of the plurality of urging devices by separating the inner ends of the particular urging devices from the pressure member when the intermediate member is moved toward the pressure member by the action of the back-torque limiting cam, it is possible to prevent the instantaneous reciprocation of the pressure member when the back-torque limiting cam is operated, thus improving the operability of the clutch operation.

In some embodiments, the urging force cut-off device comprises moving members interposed between the inner ends of the urging devices and the pressure member, wherein the moving members may separate the inner ends of the particular urging devices from the pressure member when the moving members are pushed by the intermediate member toward the urging devices when the intermediate member is moved toward the pressure member by the action of the back-torque limiting cam.

In some embodiments, where the urging force cut-off device comprises moving members interposed between the inner ends of the urging devices and the pressure member, and the moving members may separate the inner ends of the particular urging devices from the pressure member when the moving members are pushed by the intermediate member and thus moved when the intermediate member is moved toward the pressure member by the action of the back-torque limiting cam, it is possible to use a simple structure to prevent the instantaneous reciprocation of the pressure member when the back-torque limiting cam is operated, thus improving the operability of the clutch operation.

In some embodiments, the pressure member is formed with one or more recessed portions for receiving the urging devices, each recess portion having a bottom formed with an opening, wherein at least one of the one or more recessed portions is adapted to receive an urging device and a moving member, wherein each of the moving members can have a projection adapted to be projected from the opening of the recessed portion toward the intermediate member.

In some embodiments, where the pressure member is formed with recessed portions for receiving the urging devices, each recess having a bottom formed with an opening, arbitrary ones of the recessed portions being configured to receive the particular urging devices and the moving members, and each of the moving members having a projection adapted to be projected from the opening of the recessed portion toward the intermediate member, it is possible to separate the inner ends of the particular urging devices from the pressure member and control the timing of separating the inner ends of the particular urging devices from the pressure member by setting various projected dimensions of the projections.

In some embodiments, a plurality of the recessed portions are formed on a concentric circumference of the pressure member, wherein the recessed portions for receiving particular urging devices and the moving members can be formed on a circumference of the pressure member and are substantially equidistant from each other.

In some embodiments, where a plurality of the recessed portions are formed on a concentric circumference of the pressure member, the recessed portions are configured to receive particular urging devices, and the moving members are formed on a circumference of the pressure member substantially equidistant from each other, it is possible to stably hold the pressure member when the inner ends of the particular urging devices are separated from the pressure member during the movement of the intermediate member toward the pressure member by action of the back-torque limiting cam.

BRIEF DESCRIPTION OF THE DRAWINGS

These and other features, aspects and advantages are described below with reference to the drawings, which are intended to illustrate but not to limit the disclosure. In the drawings, like reference characters denote corresponding features consistently throughout similar embodiments.

FIG. 3(a) is a partial plan view of the power transmitting apparatus of FIG. 1 and FIG. 3(b) is a partial cross-sectional view of the power transmitting apparatus of FIG. 1.

FIG. 4(a) is a partial plan view of the power transmitting apparatus of FIG. 1 and FIG. 4(b) is a partial cross-sectional view of the power transmitting apparatus of FIG. 1.

DETAILED DESCRIPTION OF THE PREFERRED EMBODIMENTS

Figure 1:
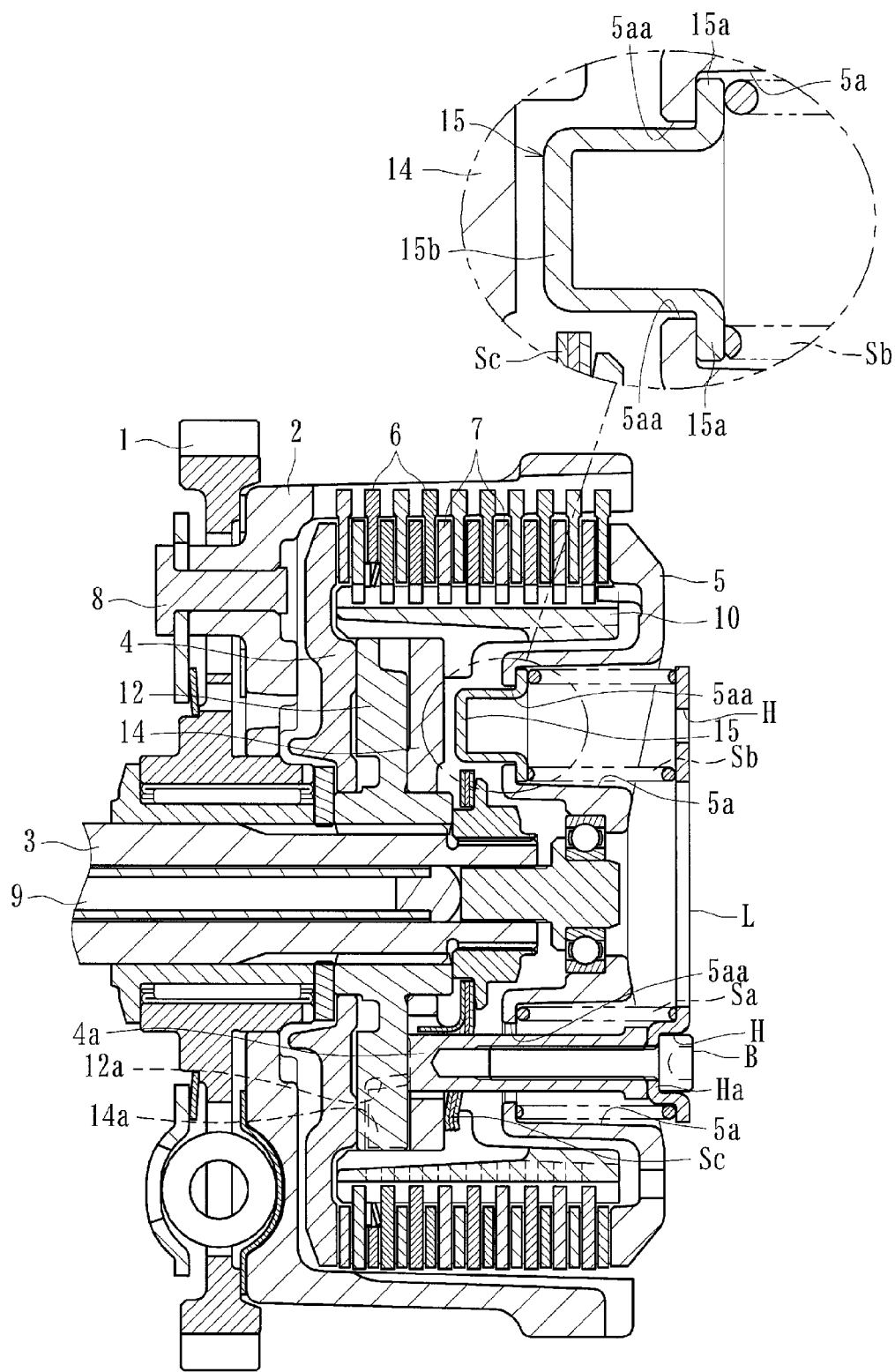
FIG. 1 A longitudinal section view of a power transmitting apparatus in accordance with an embodiment.

Several embodiments of the present disclosure are hereinafter described below with respect to the accompanying figures.

Some embodiments of the present power transmitting apparatus can be mounted on a vehicle such as a motorcycle or other vehicles, to transmit and cut-off the driving power of an engine to or from a transmission or driving wheel. As shown in FIGS. 1-11, the power transmitting apparatus comprise a clutch housing 2 on which a gear 1 as an input member is mounted, a clutch member 4 connected to a shaft 3 forming an output member, a pressure plate 5 mounted on the clutch member 4 at its right-hand end (with reference to FIG. 1), an intermediate member 10, driving clutch plates 6 connected to the clutch housing 2, driven clutch plates 7 connected to the intermediate member 10, clutch springs Sa, Sb acting as urging devices, a back-torque limiting cam (e.g., clutch member-side cam surfaces 12a and intermediate member-side cam surfaces 14a), and moving members 15 acting as an urging force cut-off device. In drawings, reference character "Sc" denotes a spring for urging the intermediate member 10 toward the clutch member 4 so as to, in a normal condition, bring the clutch member-side cam surfaces 12a and intermediate member-side cam surfaces 14a into positions opposing each other.

The gear 1 may be rotated around the shaft 3 by the driving power (rotational power) transmitted from an engine and may be connected to the clutch housing 2 via rivets 8 or other means of attachment (e.g., welding, adhesives, etc.). The clutch housing 2 is formed as a cylindrical casing opened at a right-hand end (with reference to FIG. 1) and a plurality of driving clutch plates 6 are mounted on the inner circumference walls of the clutch housing 2. Each of the driving clutch plates 6 comprises a substantially annular plate and is adapted to be rotated together with the clutch housing 2 and axially slidable (left-hand and right-hand directions with reference to FIG. 1).

In some embodiments, the clutch member 4 comprises a member to be arranged within the clutch housing 2. The center of the clutch member 4 is connected to the shaft 3 via spline fittings and the shaft 3 rotates in unison with the clutch member 4. On the other hand, the pressure member 5 is arranged at the right-hand side of FIG. 1 relative to the clutch member 4 via the intermediate member 10 and is normally urged toward the left-hand side by the clutch springs Sa, Sb. The pressure member can be adapted to pressure-contact or release (e.g., separate) the driving clutch plates 6 and driven clutch plates 7 from each other in accordance with an axial (e.g., left and right directions in FIG. 1) shift of the pressure member 5 relative to the clutch member 4.

Figure 9:
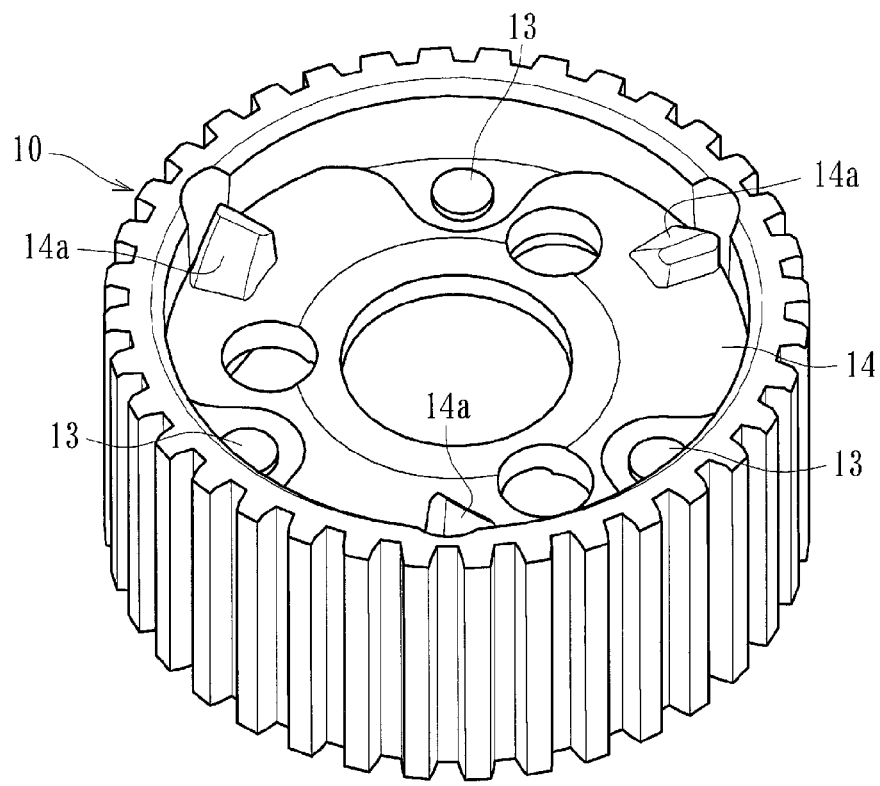
FIG. 9 A perspective view of an intermediate member of the power transmitting apparatus of FIG. 1.

The intermediate member 10 can be formed with spline grooves on its circumference on which the driven clutch plates 7 are spline fitted. The intermediate member can be arranged between the clutch member 4 and the pressure member 5 so as to be rotated together with them. In particular, the spline grooves are formed on the intermediate member 10 on its whole circumference, as shown in FIG. 9, and the driven clutch plates 7 are fitted on the spline grooves. This arrangement allows, although the movement of the driven clutch plates 7 in the rotational direction may be restricted, the driven clutch plates 7 to be rotated together with the intermediate member 10 while allowing axial movement of the driven clutch plates 7 relative to the intermediate member 10.

These driven clutch plates 7 can be arranged alternately with the driving clutch plates 6 so as to form a lamination therewith and can be adapted to be pressure-contacted or released to or from each other. That is, both the clutch plates 6, 7 can be pressure-contacted when the pressure member 5 is pressed toward the left-hand direction in FIG. 1 and can enable the rotational power of the clutch housing 2 to be transmitted to the clutch member 4 and the shaft 3 via the intermediate member 10. On the other hand, the clutch plates 6, 7 can be released (e.g., separated from each other) when the urging force of the pressure member 5 is released and the rotational power of the clutch housing 2 may not be transmitted to the clutch member 4 nor to the shaft 3.

In this case, it should be noted that "release" of the clutch plates 6, 7 means a condition in which the pressure-contact between the plates is lost and thus the clutch member 4 does not follow the rotation of the clutch housing 2 (e.g., a condition in which the driving clutch plates 6 rotate relative to the driven clutch plates 7) and thus it is out of the question whether there is any clearance between the clutch plates 6, 7.

In some embodiments, the circumferential edge surface of the pressure member 5 abuts against the rightmost (with reference to FIG. 1) end of the driving clutch plate 6 (or driven clutch plate 7) and both the clutch plates 6, 7 are normally pressure-contacted each other by the pressure member 5 urged by the clutch springs Sa, Sb. Accordingly, the clutch housing 2 and the clutch member 4 can be kept in a normally connected condition so that the gear 1 may rotate the shaft 3 when the rotational power is inputted to the gear 1. The circumferential edge surface of the clutch member 4 abuts against the driving clutch plate 6 (or driven clutch plate 7) positioned at a most left position.

An axially extending push rod 9 can be arranged within the shaft 3. The pressure member 5 may be moved toward a right (with reference to FIG. 1) direction against the clutch springs Sa, Sb when a driver of a motorcycle operates a push rod 9 to move it toward the right-hand (with reference to FIG. 1) direction by operating an operating device (clutch lever) not shown in the figures. The pressure-contacting force between the driving and driven clutch plates 6 and 7 is released when the pressure member 5 is moved toward the right-hand (with reference to FIG. 1) direction, and thus the rotational power inputted to the gear 1 and the clutch housing 2 is cut-off and may not be transmitted to the shaft 3.

That is, the pressure member 5 can be constructed so that the pressure-contact or the release between the plates 6 and 7 may be performed by its axial movement relative to the clutch member 4. In FIG. 1, a reference numeral 4a denotes boss portions projected from the clutch member 4 toward the pressure member 5 for mounting the clutch springs (urging devices) Sa thereon. In addition, a reference character B denotes bolts secured on the boss portion 4a for mounting a stay L acting as a securing member for the clutch springs Sa, Sb. That is, the clutch springs Sa, Sb are mounted between the stay L and bottoms of recessed portions 5a formed on the pressure member 5 as described later more in detail.

Figure 7:
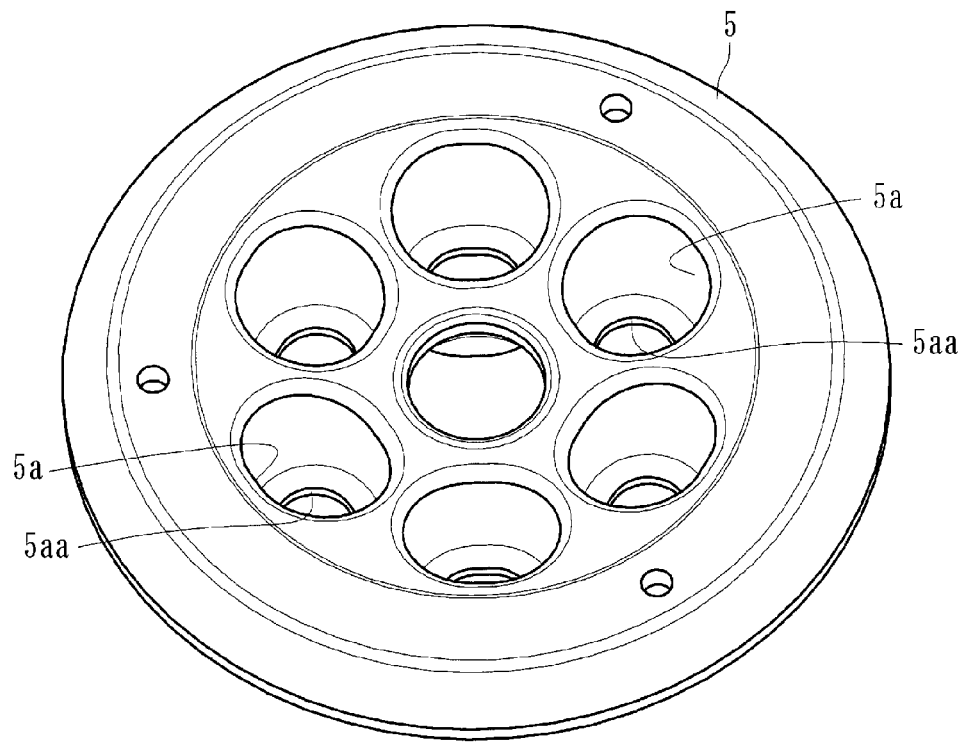
FIG. 7 A perspective view of a pressure member of the power transmitting apparatus of FIG. 1.
Figure 8:
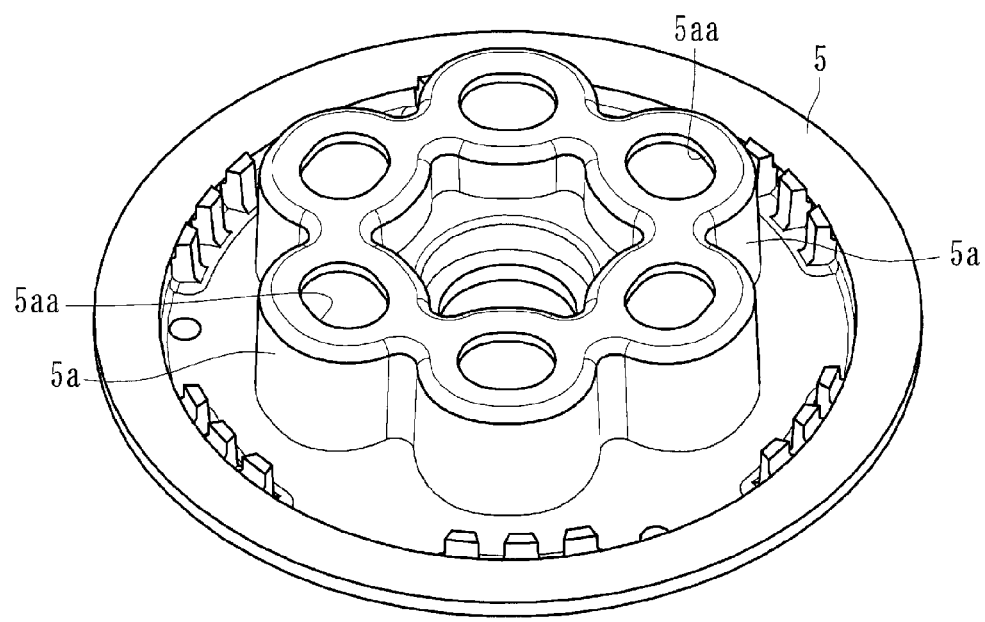
FIG. 8 A perspective view of the pressure member of FIG. 7, showing the opposite side thereof.

As shown in FIGS. 7 and 8, a plurality (six in the illustrated embodiment) of recessed portions 5a can be formed on the pressure member 5 on a concentric circle thereof. Each recessed portion is formed with an opening 5aa. The recessed portions 5a can be adapted to receive the clutch springs Sa, Sb (urging devices) and the boss portions 4a can be inserted through the recessed portions 5a for receiving the clutch springs Sa. Moving members 15 can be arranged in the openings 5aa formed in the bottoms of the recessed portions 5a for receiving the clutch springs Sb.

Figure 5:
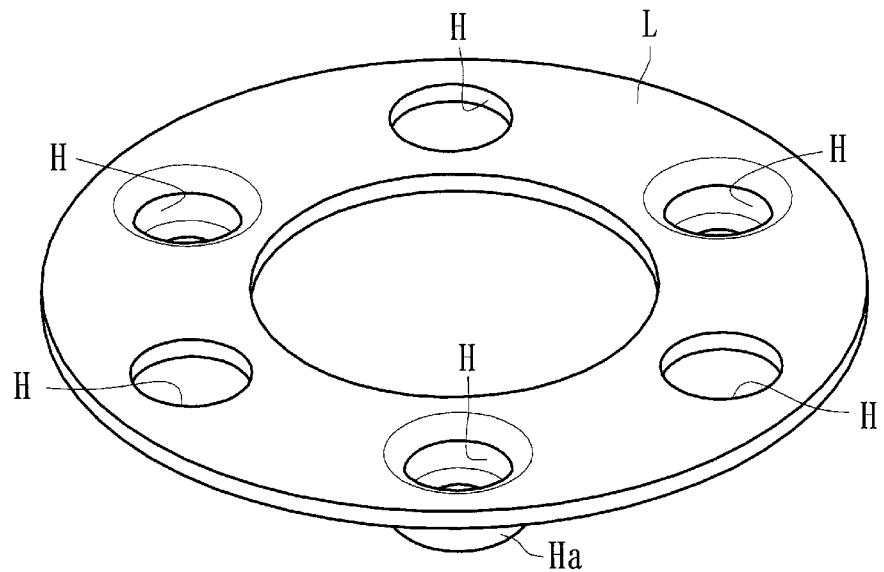
FIG. 5 A perspective view showing a securing member (stay) of the power transmitting apparatus of FIG. 1.
Figure 6:
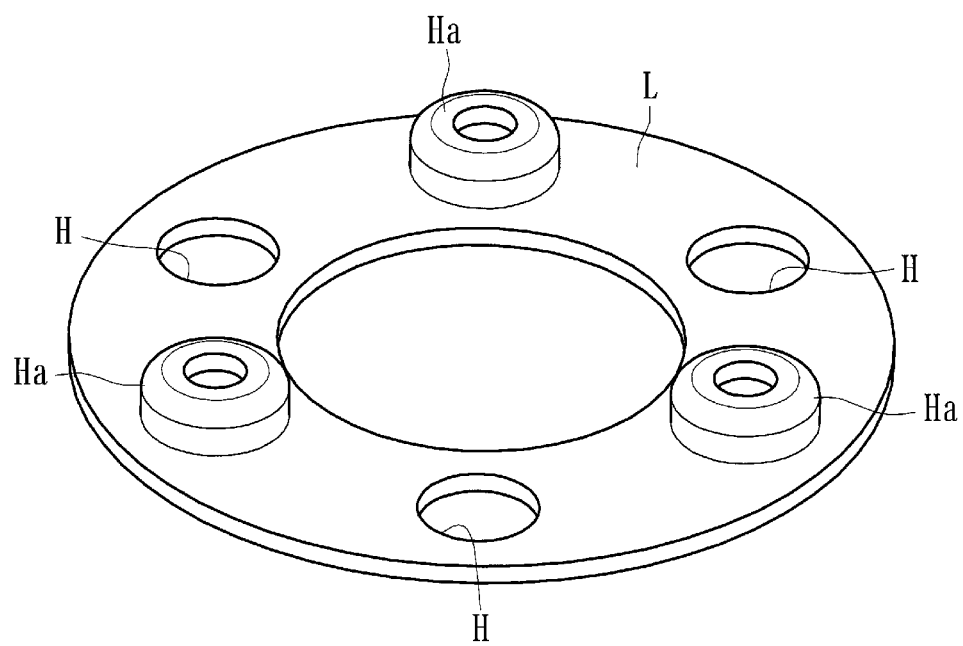
FIG. 6 A perspective view of the securing member of FIG. 5, showing the opposite side thereof.

As shown in FIGS. 5 and 6, the stay (securing member) L can comprise an annular metallic member and can be secured on the projected ends of the boss portions 4a projected from the clutch member 4 by the bolts B. The stay L can be formed with apertures H at positions corresponding to the recessed portions 5a of the pressure member 5 and the apertures H corresponding to the recessed portions 5a receiving the clutch springs Sa can be formed with projections Ha. In some embodiments, one end (e.g., the outer end) of each clutch spring Sa is secured around each projection Ha.

The clutch springs (urging devices) Sa, Sb can comprise a plurality of coil springs, the outer ends (the right-hand ends in FIG. 1) of which are mounted on the stay L (securing member), and the inner ends (e.g., the left-hand ends in FIG. 1) of which are mounted on the pressure member 5 via moving members (urging force cut-off device) 15. In some embodiments, the clutch springs Sa, Sb are intended to normally urge the pressure member 5 toward the intermediate member 10 and the clutch member 4 (toward the left-hand direction in FIG. 1) so as to normally press-contact the driving clutch plates 6 and the driven clutch plates 7.

In some embodiments, although the clutch springs arranged around the bolts B (e.g., three clutch springs in the illustrated embodiment) are denoted by "Sa" and the clutch springs mounted on the pressure member 5 via the moving members 15 (e.g., three clutch springs in the illustrated embodiment) are denoted by "Sb", all of these clutch springs Sa, Sb can comprise coil springs configured to normally urge the pressure member 5 toward the intermediate member 10 and the clutch member 4 (toward the left-hand direction in FIG. 1) so as to normally press-contact the driving clutch plates 6 and the driven clutch plates 7. However, in order to clearly distinguish the function of the clutch springs Sb from that of the clutch springs Sa, the clutch springs Sb are called "particular urging devices" in the present disclosure.

Figure 10:
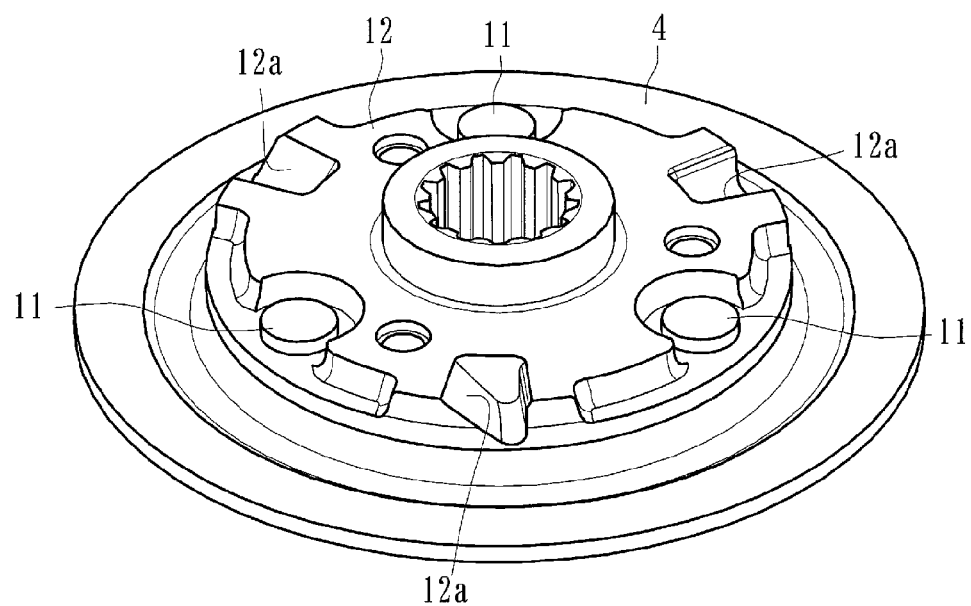
FIG. 10 A perspective view of a clutch member of the power transmitting apparatus of FIG. 1.

As shown in FIGS. 9 and 10, a cam forming member 12 can be secured on the clutch member 4 via rivets 11. Furthermore, a cam forming member 14 can be secured on the intermediate member 10 via rivets 13. These cam forming members 12, 14 can be assembled so that they are opposed to each other. The cam forming member 12 can be formed with clutch member-side cam surfaces 12a and the cam forming member 14 can be formed with intermediate member-side cam surfaces 14a. These cam surfaces 12a, 14a can be assembled so that they are opposed to each other to form the back-torque limiting cam of the present embodiment.

That is, the back-torque limiting cam can comprise the clutch member-side cam surfaces 12a formed on the clutch member 4 via the cam forming member 12 and the intermediate member-side cam surfaces 14a formed on the intermediate member 10 via the cam forming member 14. The back-torque limiting cam can be constructed so that the cam action caused by the clutch member-side cam surfaces 12a and the intermediate member-side cam surfaces 14a may displace the intermediate member 10 in an axial direction (upward with reference to FIG. 4(b)) by a distance "t." Such movement of the intermediate member 10 can separate the driving clutch plates 6 from the driven clutch plates 7, as shown in FIG. 4, when the rotational speed of the shaft 3 (output member) exceeds that of the input member (e.g., the gear 1), thus creating a relative rotation between the intermediate member 10 and the clutch member 4.

Figure 4:
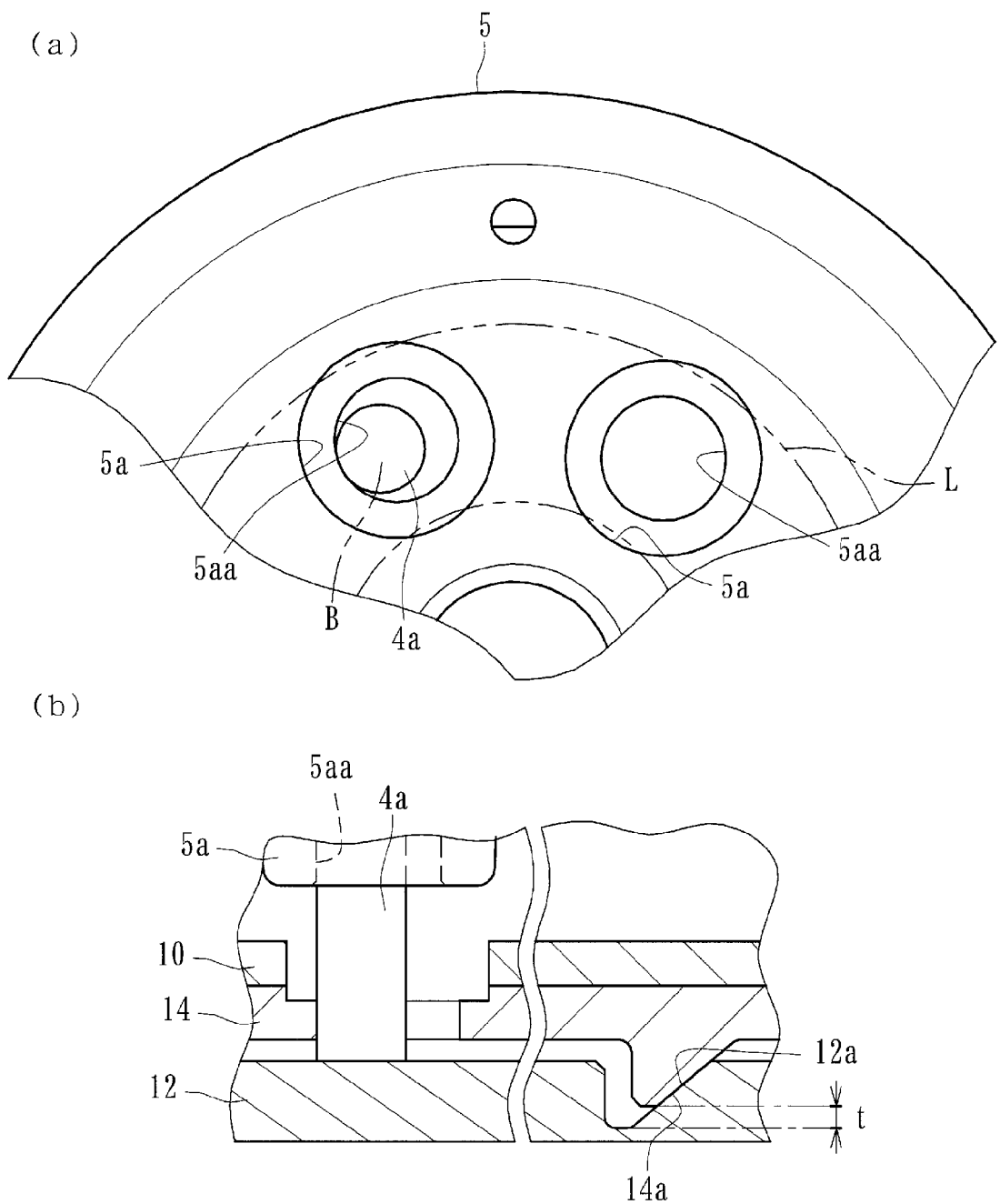
FIG. 4 A schematic view showing a condition after action of the back-torque limiting cam of the power transmitting apparatus of FIG. 1, where

In some embodiments, as shown in FIG. 4, when the intermediate member 10 is axially displaced a distance "t" by the back-torque limiting cam action, the side surface of the boss portion 4a abuts against the edge surface of the opening 5aa in the recessed portion 5a. Such abutment can limit further displacement (relative rotation and axial displacement). Accordingly, the axial displacement of the intermediate member 10 caused by the back-torque limiting cam may be limited to a predetermined distance when the rotational speed of the shaft 3 (output member) has exceeded that of the input member such as the gear 1 and a relative rotation between the intermediate member 10 and the clutch member 4 has been created.

According to some embodiments, the power transmitting apparatus comprises an urging force cut-off device comprising moving members 15. The urging force cut-off device can be constructed so that it cuts off the urging force applied from the clutch springs Sb (particular urging devices) to the pressure member 5. Such cutoff can be accomplished by separating the inner ends of the clutch springs Sb (particular urging devices) of the plurality (e.g., six in the illustrated embodiment) of clutch springs Sa, Sb (urging devices) from the pressure member 5 (see, e.g., FIG. 11) when the intermediate member 10 is moved toward the pressure member 5 (toward the right-hand direction in FIG. 1) by the cam action of the back-torque limiting cam.

Each moving member 15 (urging force cut-off device) can comprise a cylindrical member having a base end portion 15a formed of flange and a projected portion 15b adapted to be projected from the opening 5aa of the recessed portion 5a toward the intermediate member 10 (e.g., toward the cam forming member 14). The base end portion 15a can act as a stopper for preventing the moving member 15 from being slipped off through the opening 5aa. The projected portion 15b can act as a part to be pressed by the intermediate member 10 when the intermediate member 10 is moved toward the pressure member 5 by the cam action of the back-torque limiting cam.

Figure 11:
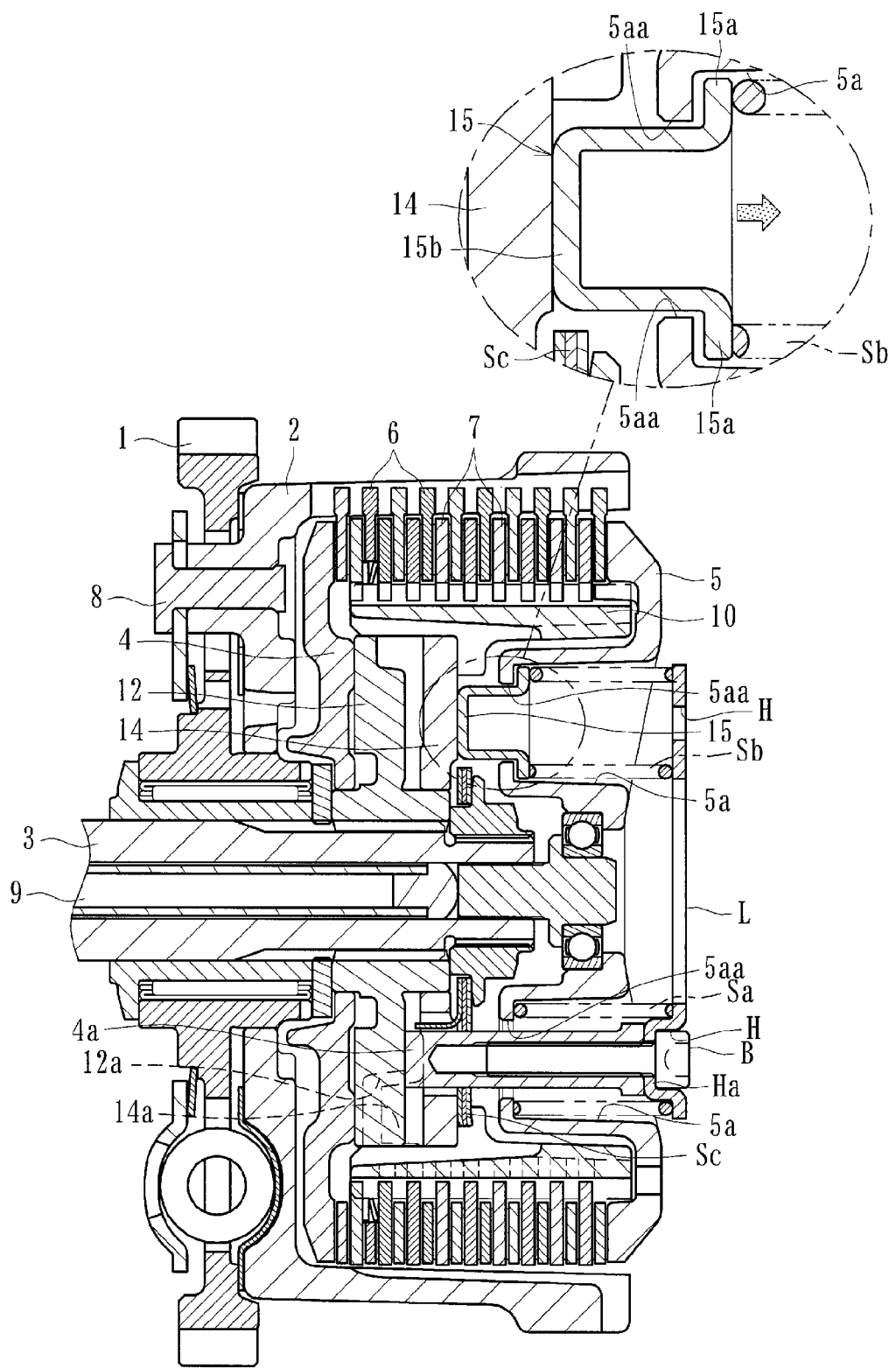
FIG. 11 A longitudinal section view of the power transmitting apparatus of FIG. 1 showing a condition after actuation of the back-torque limiting cam.

Thus, the moving members 15 may separate the inner ends of the clutch springs Sb (particular urging devices) from the pressure member 5, as shown in FIG. 11, by moving toward the right (with reference to FIG. 11) under pressure from the intermediate member 10 when the intermediate member 10 is moved toward the pressure member 5 by the cam action of the back-torque limiting cam. That is, the urging force applied by the particular clutch springs Sb (particular urging devices) to the pressure member 5 may be cut off by separating the inner ends of the particular clutch springs Sb (particular urging devices) of the plurality (six) of the clutch springs Sa, Sb (urging devices) from the pressure member 5 when the intermediate member 10 is moved toward the pressure member 5 by the cam action of the back-torque limiting cam. Under such circumstances, since the urging force applied to the pressure member 5 by the other clutch springs Sa is maintained, the urging force applied to the pressure member 5 amounts to a value obtained by subtracting the urging force of the particular springs Sb from that of the total clutch springs (Sa+Sb).

As can be seen from the description above, some embodiments of the present disclosure comprise a moving member 15 which may cut off the urging force applied by the particular urging devices (e.g., clutch springs Sb) to the pressure member 5 by separating the inner ends of the particular urging devices (e.g., clutch springs Sb) of the plurality of urging devices (e.g., clutch springs Sa, Sb) when the intermediate member 10 is moved toward the pressure member 5 by the cam action of the back-torque limiting cam. The above action can achieve the following: since the urging force applied to the pressure member 5 by the urging devices (clutch springs Sa, Sb) may be reduced by the moving member 15 without causing any movement of the pressure member 5 itself, it is possible to release the pressure-contact between the driving clutch plates 6 and the driven clutch plates 7, thus reducing the clutch torque capacity in order to inhibit instant reciprocal motion of the pressure member 5 when the back-torque limiting cam is actuated. Such inhibition of instant reciprocal motion of the pressure member 5 can improve the operability of the clutch operation.

Also according to the present disclosure, since the urging force cut-off device can comprise moving members 15 interposed between the inner ends of the particular urging devices (clutch springs Sb) and the pressure member 5, and since the moving members 15 may, by being pressed by the intermediate member 10, separate the inner ends of the particular urging devices (clutch springs Sb) from the pressure member 5 when the intermediate member 10 is moved toward the pressure member 5 by the cam action of the back-torque limiting cam, it is possible to inhibit instantaneous reciprocal motion of the pressure member 5 using a simple structure when the back-torque limiting cam is actuated, and thus to improve the operability of the clutch operation.

As described before, since the pressure member 5 can be formed with the recessed portions 5a each having an opening for receiving the urging devices (e.g., clutch springs Sa, Sb) and the particular urging devices (e.g., clutch springs Sb), the moving members 15 can be received in the recessed portions 5a, and each moving member 15 can have projected portions 15b projected toward the intermediate member 10 from the opening 5aa of the recessed portion 5a, it is possible to separate the inner ends of the particular urging devices (e.g., clutch springs Sb) from the pressure member 5. Furthermore, it is possible to adjust the timing (e.g., the operation starting timing of the moving members 15) for separation of the inner ends of the particular urging devices (e.g., clutch springs Sb) from the pressure member 5 by varying the dimensions of the projections of the projected portions 15b.

Figure 2:
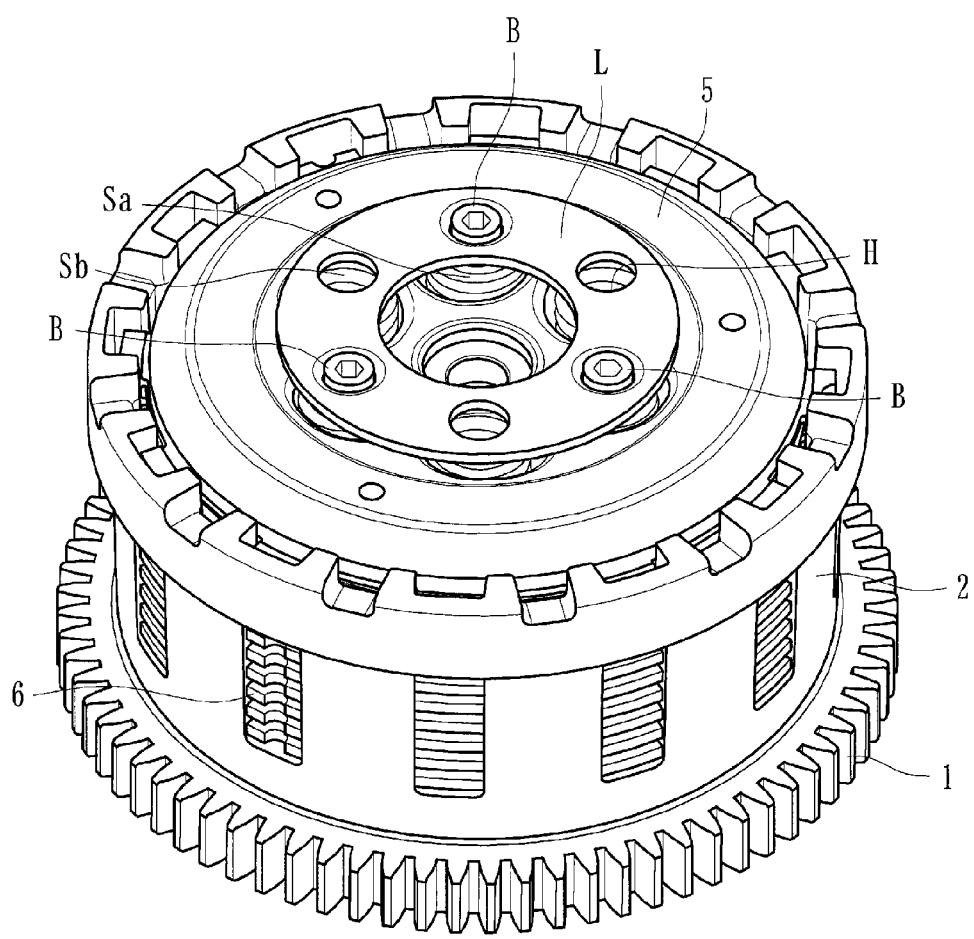
FIG. 2 A perspective view showing the power transmitting apparatus of FIG. 1.
Figure 3:
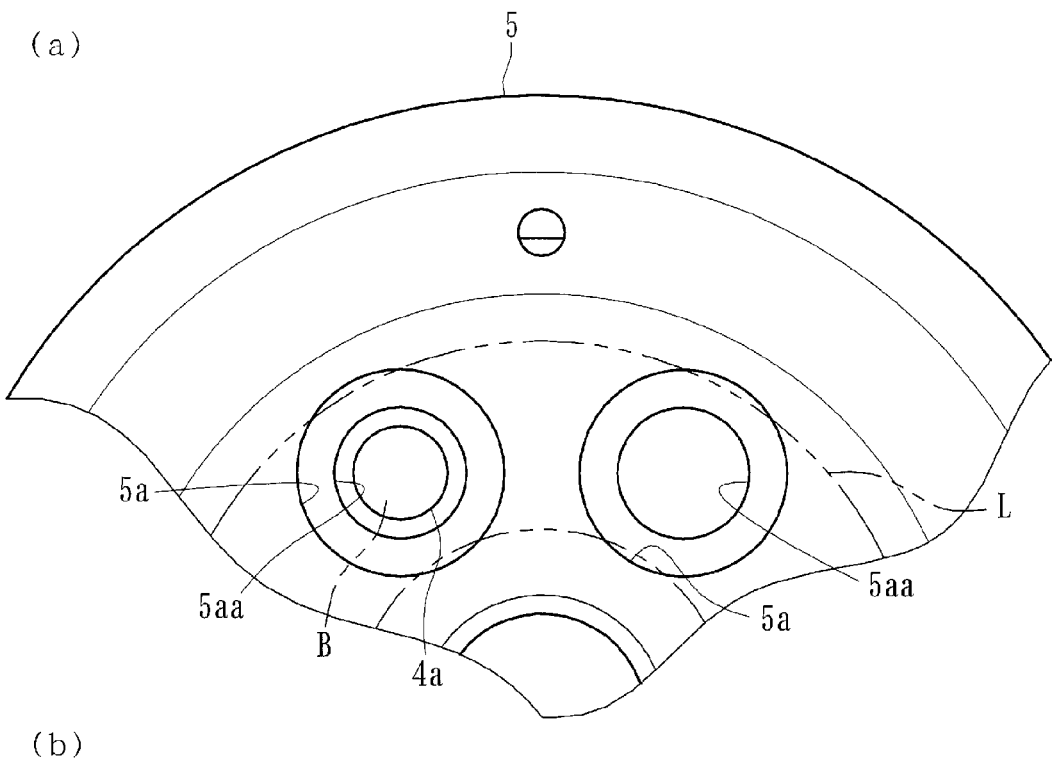
FIG. 3 A schematic view showing a condition before action of the back-torque limiting cam of the power transmitting apparatus of FIG. 1, where
Figure 3:
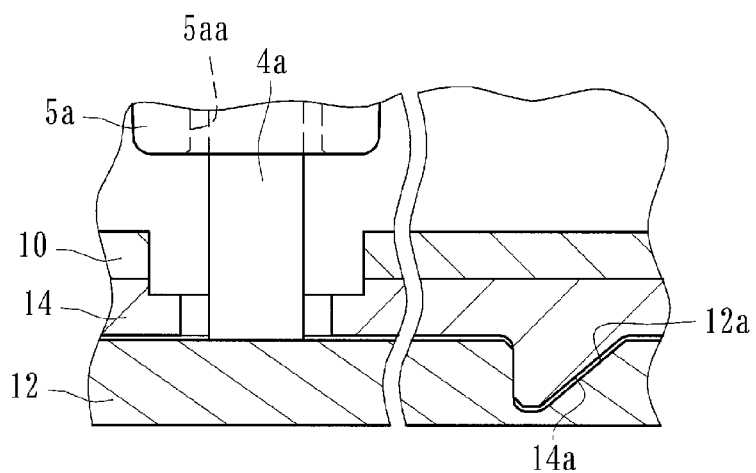

As shown in FIGS. 7 and 8, since a plurality of the recessed portions 5a can be formed on a concentric circumference of the pressure member 5, and since the recessed portions 5a for receiving particular urging devices (e.g., clutch springs Sb) and the moving members 15 can be formed on a circumference of the pressure member 5 substantially equidistant from each other (e.g., every other three ones of six recessed portions 5a in the illustrated embodiment of FIG. 2), it is possible to stably hold the pressure member 5 when the inner ends of the particular urging devices (clutch springs Sb) are separated from the pressure member 5 during the movement of the intermediate member 10 toward the pressure member 5 by action of the back-torque limiting cam. This can allow the urging force from the clutch springs Sa to be substantially equally-applied in the circumferential dimension of the pressure member 5.

Figure 12:
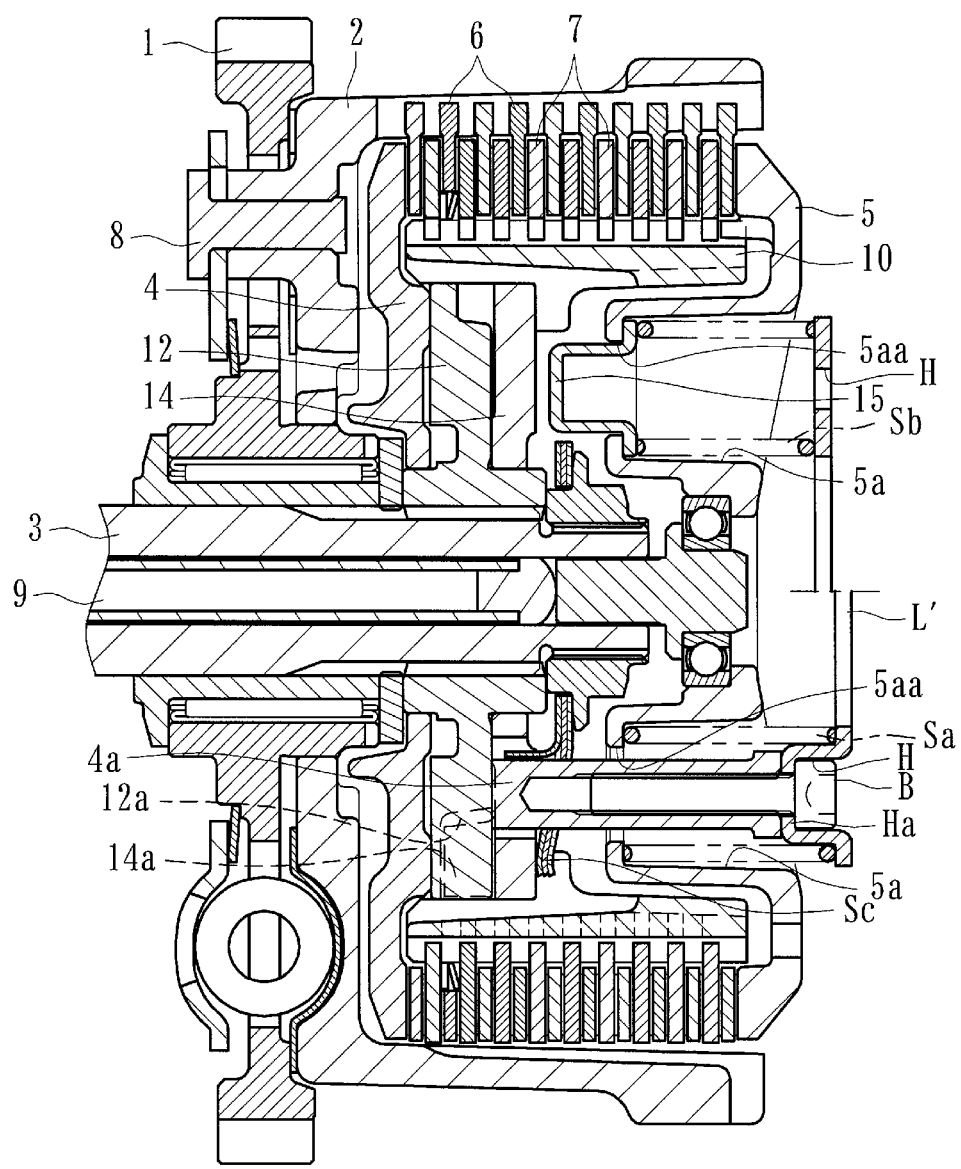
FIG. 12 A wholly longitudinal section view of another embodiment of a power transmitting apparatus.

In some additional embodiments, a power transmitting apparatus can be configured to be mounted on a vehicle such as a motorcycle and further configured to transmit or cut-off the driving power of an engine to or from a transmission or driving wheel. As shown, for example, in FIGS. 12-14, the power transmitting apparatus of the present disclosure can comprise a clutch housing 2 on which a gear 1 as an input member is mounted, a clutch member 4 connected to a shaft 3 forming an output member, a pressure plate 5, an intermediate member 10, driving clutch plates 6 connected to the clutch housing 2, driven clutch plates 7 connected to the intermediate member 10, clutch springs Sa, Sb acting as an urging devices, a back-torque limiting cam (e.g., clutch member-side cam surfaces 12a and intermediate member-side cam surfaces 14a), and moving members 15 acting as an urging force cut-off device. In the figures, some of the same reference numerals are used for designating the same parts of the previous embodiment as those used in the following embodiments and thus detailed description of them will be omitted.

Figure 13:
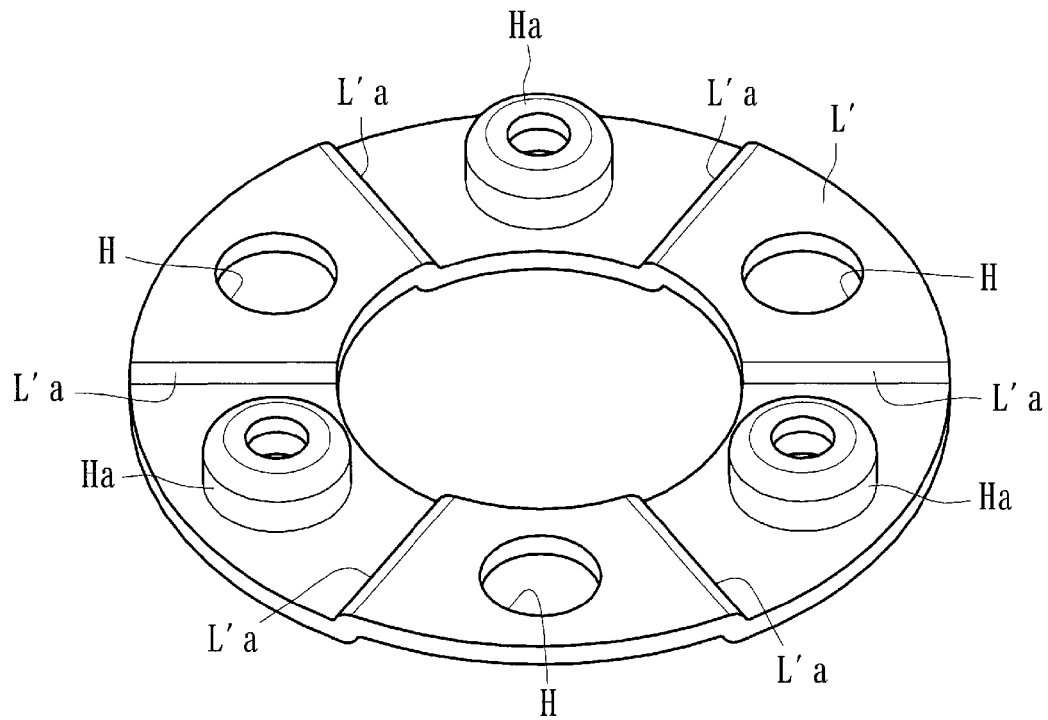
FIG. 13 A perspective view showing the securing member (stay) of the power transmitting apparatus of FIG. 12.
Figure 14:
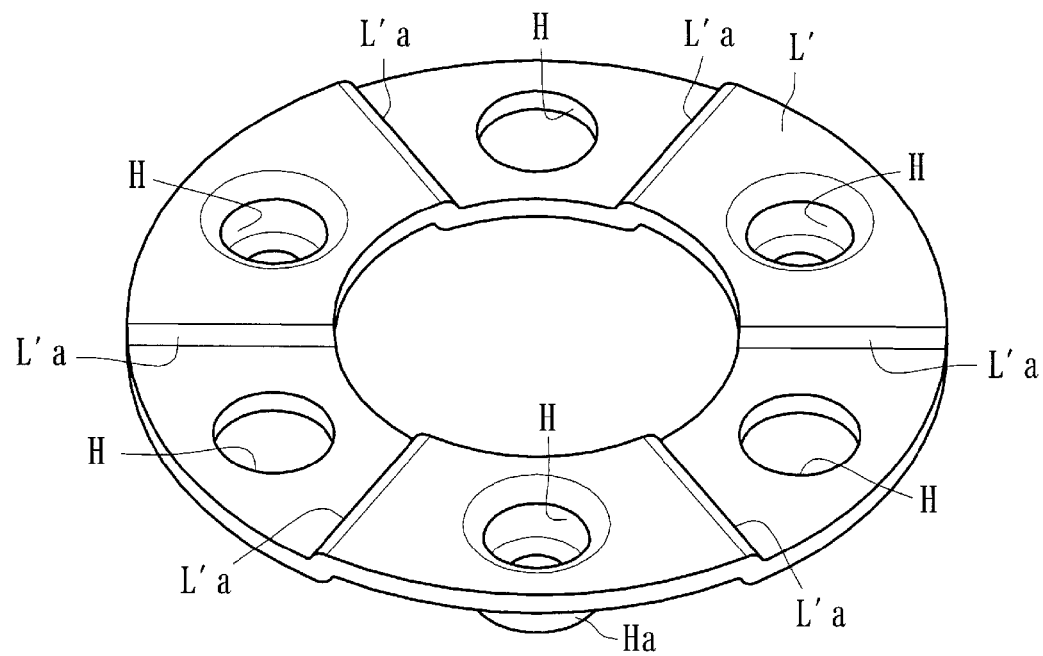
FIG. 14 A perspective view of the securing member of FIG. 13 showing the opposite side thereof.
Figure 15:
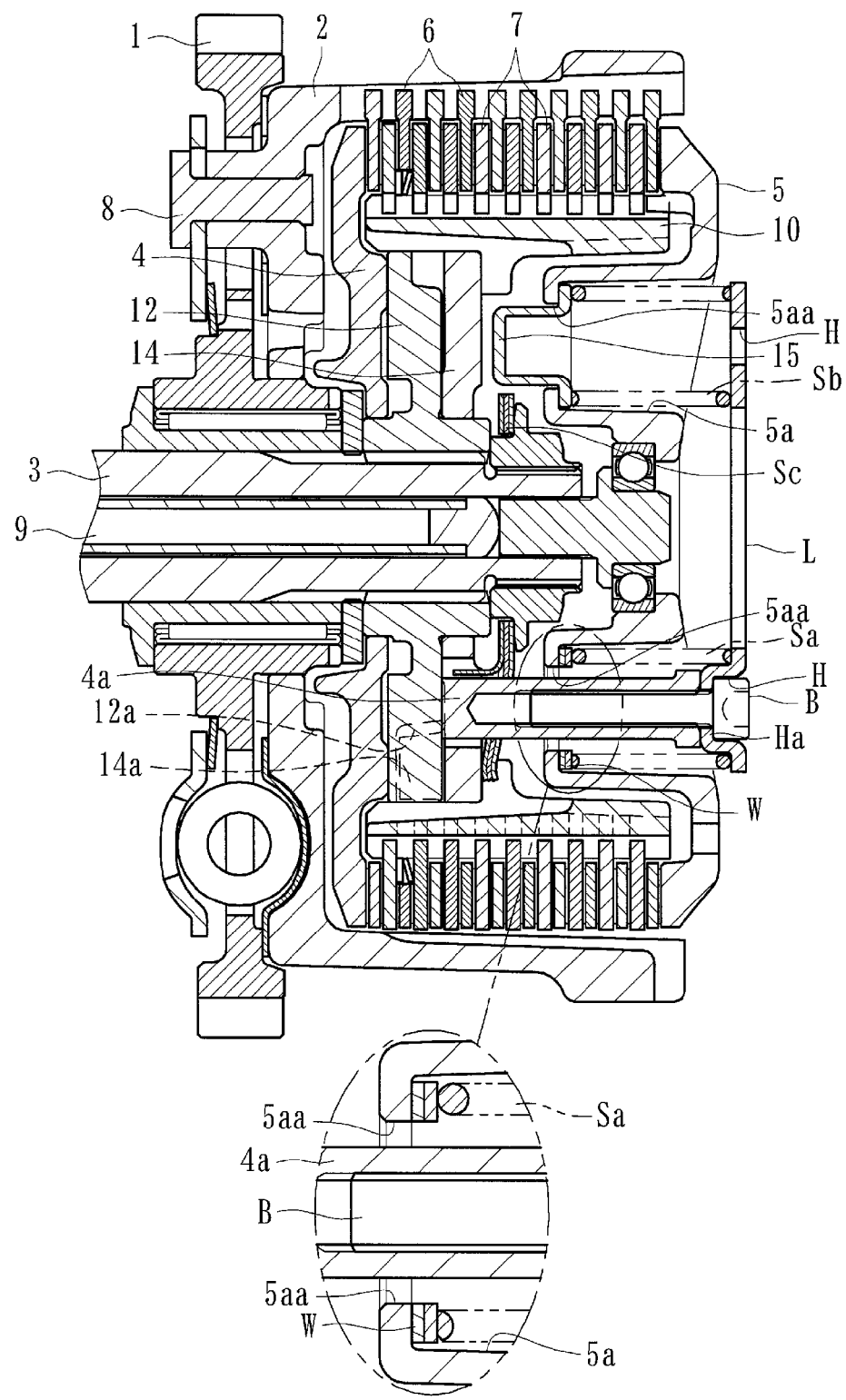
FIG. 15 A longitudinal section view of another embodiment of a power transmitting apparatus.

In some embodiment, a stay L', which can be used as the securing device of this embodiment, can be made of an annular metallic member formed with apertures H. The apertures H can be positioned corresponding to the recessed portions 5a of the pressure member 5 as shown in FIGS. 13 and 14 and can be adapted to be secured on the projected ends of the boss portions 4a projected from the clutch member 4 by the bolts B. Steps L'a can be formed in a position between mutually adjacent apertures H (e.g., between the aperture H corresponding to the recessed portion 5a for receiving the clutch spring Sa and the aperture H corresponding to the recessed portion 5a for receiving the clutch spring Sb) to form a difference in height between them.

That is, the provision of the steps L'a can enable the position of a surface in which the aperture H corresponding to the clutch spring Sb is formed to be set nearer to the pressure member 5 than a surface in which the aperture H corresponding to the clutch spring Sa is formed. The different positions of the apertures H can make a difference in the urging force of the clutch springs Sa, Sb by the height of the step L'a when the same coil springs are used for the clutch springs Sa, Sb. Accordingly, it is possible to cause difference in the urging force between the particular urging devices (e.g., clutch springs Sb) and the other urging devices (e.g., clutch springs Sa) and thus adjust the torque capacity when the intermediate member 10 is moved toward the pressure member 5 by the cam action of the back-torque limiting cam.

In some embodiments, it is possible to form a stay wherein the surface in which the aperture H corresponding to the clutch spring Sb is formed is set at a position farther away from the pressure member 5 than a surface of the aperture H corresponding to the clutch spring Sa. In addition, it is also possible to arrange washers W in the recessed portions 5a receiving the clutch springs Sa so that the inner ends of the clutch springs Sa may abut the washers W. This can enable adjustment of the torque capacity when the intermediate member 10 is moved toward the pressure member 5 by the cam action of the back-torque limiting cam.

In some additional embodiments, a power transmitting apparatus of the present disclosure is intended to be mounted on a vehicle such as a motorcycle and to transmit or cut-off the driving power of an engine to or from a transmission or driving wheel. As shown, for example in FIGS. 16 and 17, the power transmitting apparatus of the present invention can comprise a clutch housing 2 on which a gear 1 as an input member is mounted, a clutch member 4 connected to a shaft 3 forming an output member, a pressure plate 5, an intermediate member 10, driving clutch plates 6 connected to the clutch housing 2, driven clutch plates 7 connected to the intermediate member 10, clutch springs Sa, Sb acting as an urging devices, a back-torque limiting cam (e.g., clutch member-side cam surfaces 12a and intermediate member-side cam surfaces 14a), and moving members 15' acting as an urging force cut-off device. In the figures, some of the same reference numerals are used for designating the same parts of the previous embodiments as those used in the following embodiments and thus detailed description of them will be omitted.

Figure 16:
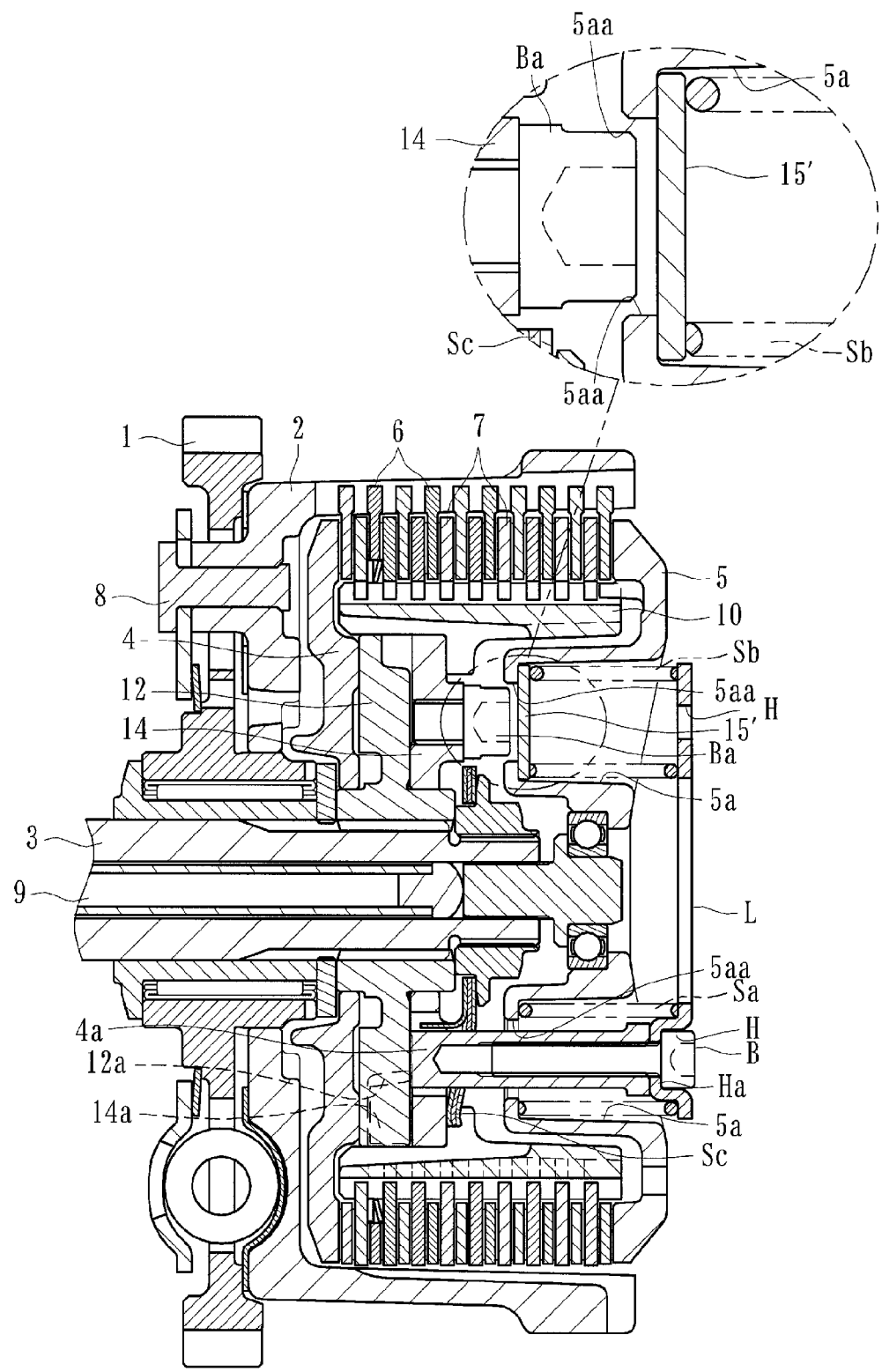
FIG. 16 A longitudinal section view of another embodiment of a power transmitting apparatus.
Figure 17:
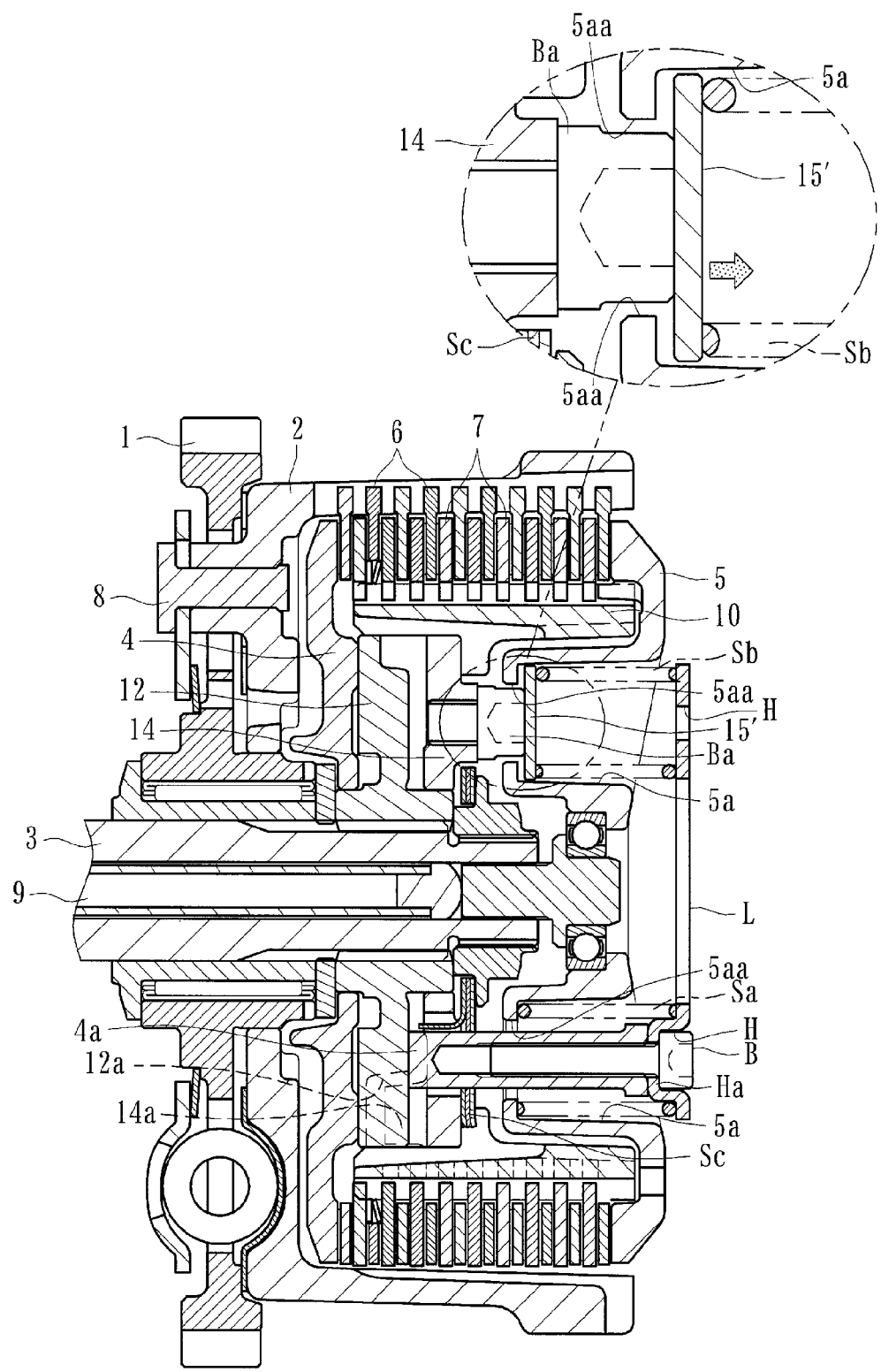
FIG. 17 A longitudinal section view of the power transmitting apparatus of FIG. 16 showing a condition after actuation of the back-torque limiting cam.

As shown in FIGS. 16 and 17, each moving member 15' of an embodiment can be formed of a plate member to be received in the recessed portion 5a. This moving member 15' can be interposed between the inner ends of the particular urging devices (clutch springs Sb) and the pressure member 5. The moving member 15' may also separate the inner ends of the particular urging devices (e.g., clutch springs Sb) from the pressure member 5 when pressed by the intermediate member 10 when the intermediate member 10 is moved toward the pressure member 5 by the cam action of the back-torque limiting cam.

More particularly, bolts Ba can be secured on the cam forming member 14 of the intermediate member 10 at positions corresponding to the openings 5aa of the recessed portions 5a receiving the particular urging devices (clutch springs Sb). The heads of bolts Ba can be adapted to enter into the recessed portions 5a through the openings 5aa when the intermediate member 10 is moved toward the pressure member 5 by the cam action of the back-torque limiting cam. During this process, since the moving members 15' are pushed toward the right-hand direction (with respect to FIGS. 16 and 17), the inner ends of the clutch springs Sb can be separated from the bottoms of the recessed portions 5a of the pressure member 5. According to this embodiment, since each moving member 15' is formed of a plate member, it is possible to form the moving member 15' easily and inexpensively as compared with molded or press formed parts such as those in previous embodiments.

Although the present invention has been described with reference to the preferred embodiments, the present invention is not limited to the illustrated and described embodiments. For example, other forms of the urging devices e.g. Belleville springs or elastic members may be used in place of the clutch springs Sa, Sb. In addition, other forms of urging force cut-off device may be used in place of the moving members 15, 15' if the urging force cut-off device are those which may cut-off the urging force applied to the pressure member 5 from the particular urging devices (clutch springs Sb) by separating the inner ends of the particular urging devices (clutch springs Sb) of the plurality of urging devices (clutch springs Sa, Sb) from the pressure member 5 when the intermediate member 10 is moved toward the pressure member 5 by the cam action of the back-torque limiting cam.

In addition, although it is shown in the illustrated embodiments that the power transmitting apparatus of the present invention is provided with six (6) urging devices and three (3) of them are particular urging devices, the number of the total urging devices and the particular urging devices may vary widely. For example, the power transmitting apparatus may have ten urging devices, three of them being particular urging devices. The power transmitting apparatus of the present disclosure may be applied to power transmitting apparatus of a multiple disc clutch type for automobiles, three-wheeled or four-wheeled buggies or general purpose machines other than motorcycles.

The power transmitting apparatus of the present disclosure may be applied to any power transmitting apparatus having different external configurations or additional functions if it is provided with the urging force cut-off device for cutting-off the urging force applied to the pressure member from the particular urging devices by separating the inner ends of the particular urging devices of the plurality of urging devices when the intermediate member is moved toward the pressure member by the cam action of the back-torque limiting cam.

What is claimed is:

1. A power transmitting apparatus comprising:
a clutch housing rotatable together with an input member;
a plurality of driving clutch plates mounted on the clutch housing;
a plurality of driven clutch plates alternately arranged between the driving clutch plates of the clutch housing;
a clutch member connected to an output member;
a pressure member mounted on the clutch member and axially moveable relative to the clutch member, axial movement of the pressure member relative to the clutch member creating pressure-contact or release between the driving clutch plates and the driven clutch plates;
an intermediate member spline-fitted with the driven clutch plates and interposed between the clutch member and the pressure member, the intermediate member configured to rotate with the clutch member and the pressure member;
a plurality of urging devices having outer ends mounted on a securing member, the securing member secured on a boss portion projected from the clutch member, the plurality of urging devices having inner ends wherein the inner end of at least one of the plurality of urging devices acts a against the pressure member, the urging devices being configured to normally urge the pressure member toward the intermediate member and the clutch member to achieve the pressure-contact between the driving clutch plates and the driven clutch plates; and
a back-torque limiting cam having clutch member-side cam surfaces formed on the clutch member and intermediate member-side cam surfaces formed on the intermediate member and adapted to axially move the intermediate member by a cam action between the clutch member-side cam surfaces and the intermediate member-side cam surfaces to release the pressure-contact between the driving clutch plates and the driven clutch plates when a rotational speed of the output member has exceeded that of the input member and a relative rotation between the intermediate member and the clutch member is created;
wherein a rotational power inputted to the input member may be transmitted or cut-off to or from the output member by creating pressure-contact or release between the driving clutch plates and the driven clutch plates, and wherein the power transmitting apparatus further comprises an urging force cut-off device that cuts off an urging force applied to the pressure member from one or more of the plurality of urging devices by separating the inner ends of the one or more urging devices from the pressure member when the intermediate member is moved toward the pressure member by the cam action of the back-torque limiting cam.

2. The power transmitting apparatus of claim 1, wherein the urging force cut off device comprises a plurality of moving members interposed between the inner ends of one or more of the urging devices and the pressure member, and wherein the moving members may separate the inner ends of the particular urging devices from the pressure member when the moving members are pushed and thus moved by the intermediate member when the intermediate member is moved toward the pressure member by the action of the back-torque limiting cam.

3. The power transmitting apparatus of claim 2, wherein the pressure member is formed with a plurality of recessed portions for receiving the urging devices, each recessed portion having a bottom formed with an opening, wherein a plurality of the recessed portions are adapted to receive one or more of the plurality of urging devices and one or more of the moving members, and wherein each of the moving members has a projection configured to be projected from the opening of the recessed portion toward the intermediate member.

4. The power transmitting apparatus of claim 3, wherein two or more of the plurality of the recessed portions are formed on a concentric circumference of the pressure member, and wherein the plurality of recessed portions are adapted to receive one or more of the plurality of urging devices and one or more of the moving members are formed on a circumference of the pressure member substantially equidistantly apart from each other.

5. The power transmitting apparatus of claim 2, wherein the plurality of moving members are interposed between the pressure member and the inner ends of at least two of, but fewer than all of the urging devices.

6. The power transmitting apparatus of claim 5, wherein the pressure member is formed with a plurality of recessed portions for receiving the urging devices, each recessed portion having a bottom formed with an opening, wherein a plurality of the recessed portions are adapted to receive one or more of the plurality of urging devices and one or more of the moving members, and wherein each of the moving members has a projection configured to be projected from the opening of the recessed portion toward the intermediate member.

7. The power transmitting apparatus of claim 6, wherein one or more of the plurality of recessed portions are formed on a concentric circumference of the pressure member, and wherein the plurality of recessed portions are adapted to receive one or more of the plurality of urging devices and one or more of the moving members are formed on a circumference of the pressure member substantially equidistantly apart from each other.

8. The power transmitting apparatus of claim 1, wherein the inner end of at least one of the plurality of urging devices is in direct contact with the pressure member.

9. A power transmitting apparatus comprising:
a clutch housing rotatable together with an input member;
a plurality of driving clutch plates mounted on the clutch housing;
a plurality of driven clutch plates alternately arranged between the driving clutch plates of the clutch housing;
a clutch member connected to an output member;
a pressure member mounted on the clutch member and axially movably relative to the clutch member, axial movement of the pressure member relative to the clutch member creating pressure-contact or release between the driving clutch plates and the driven clutch plates;
an intermediate member spline-fitted with the driven clutch plates and interposed between the clutch member and the pressure member, the intermediate member configured to rotate with the clutch member and the pressure member;
a plurality of urging devices, the plurality of urging devices having outer ends mounted on a securing member, the securing member secured on a boss portion projected from the clutch member, the plurality of urging devices having inner ends wherein the inner end of at least one of the plurality of urging devices acts a against the pressure member, the urging devices being configured to normally urge the pressure member toward the intermediate member and the clutch member to achieve the pressure-contact between the driving clutch plates and the driven clutch plates; and
a back-torque limiting cam having clutch member-side cam surfaces formed on the clutch member and intermediate member-side cam surfaces formed on the intermediate member and adapted to axially move the intermediate member by a cam action between the clutch member-side cam surfaces and the intermediate member-side cam surfaces to release the pressure-contact between the driving clutch plates and the driven clutch plates when a rotational speed of the output member has exceeded that of the input member and a relative rotation between the intermediate member and the clutch member is created;
wherein a rotational power inputted to the input member may be transmitted or cut-off to or from the output member by creating pressure-contact or release between the driving clutch plates and the driven clutch plates, and wherein the power transmitting apparatus further comprises a means for cutting-off an urging force applied to the pressure member from one or more of the plurality of urging devices by separating the inner ends of the one or more urging devices from the pressure member when the intermediate member is moved toward the pressure member by the cam action of the back-torque limiting cam.

10. The power transmitting apparatus of claim 9, wherein the inner end of at least one of the plurality of urging devices is in direct contact with the pressure member.

* * * * *

UNITED STATES PATENT AND TRADEMARK OFFICE
CERTIFICATE OF CORRECTION

| | |
|---|---|
| PATENT NO. | : 8,627,938 B2 |
| APPLICATION NO. | : 13/560923 |
| DATED | : January 14, 2014 |
| INVENTOR(S) | : Kataoka et al. |

Page 1 of 1

It is certified that error appears in the above-identified patent and that said Letters Patent is hereby corrected as shown below:

In the Claims

In column 13 at line 60, In Claim 1, change "acts a" to --acts--.

In column 15 at line 29 (approx.), In Claim 9, change "acts a" to --acts--.

Signed and Sealed this
Twenty-first Day of October, 2014

Michelle K. Lee
*Deputy Director of the United States Patent and Trademark Office*